UNITED STATES PATENT OFFICE 2,484,423

PROCESS FOR THE PREPARATION OF POLYVINYLAMINE SALTS

Delbert D. Reynolds and William O. Kenyon, Rochester, N. Y., assignors to Eastman Kodak Company, Rochester, N. Y., a corporation of New Jersey No Drawing. Application October 30, 1945, Serial No. 625,690

7 Claims. (Cl. 260—89.7)

The invention relates to new synthetic resins and more particularly to salts and N-acyl derivatives of polyvinylamine.

It is known that simple primary amines can be obtained by the Gabriel synthesis, wherein an N-substituted phthalimide is hydrolyzed with a strong mineral acid or an inorganic base at high temperatures and under pressure to form primary amines and phthalic acid. Under these conditions, the reaction is not clean cut, and produces considerable by-products admixed with the desired amine. Usually the amine product can be separated and purified by methods of distillation, crystallization, extraction, and the like. In polymer chemistry, however, the isolation of the desired product by such methods is not possible. In order to obtain a pure resin on a structural basis, the reaction must go to completion along the desired path. Otherwise residual or partially reacted groups will still be a part of the polymer molecule and cannot be removed therefrom. Obviously, the usual conditions of the Gabriel synthesis cannot be employed for preparing pure polymeric amines from the corresponding polyvinylphthalimides.

Polymeric products containing a substantial portion of groups as free amino groups have also been prepared from polymeric N-vinylimides, for example, from polyvinylphthalimide and polyvinylsuccinimide, by subjecting said type of compounds to hydrolysis in the presence of strong mineral acids and strong inorganic bases. The products of this type of hydrolysis, in all instances, had only a portion of the nitrogen combined in the form of amino nitrogen. In one example, polyvinylsuccinimide had been hydrolyzed with sodium hydroxide to polyvinylsuccinamic acid, with hydrochloric acid, under mild conditions to a gelatinous material, with concentrated hydrochloric acid at high temperatures to a compound having but 75 per cent of the nitrogen present as amino nitrogen, and with ethanolamine to materials containing both free amino and free carboxyl groups. In other words, a pure polymeric vinylamine had not been obtained, but a polymer containing up to 75 per cent of the nitrogen present in the form of —NH₂ groups and the balance of the nitrogen in the form of incompletely hydrolyzed imide groups.

In another example, the hydrolysis of polyvinylphthalimide with hydrobromic acid in phenol gave a product soluble in either acids or bases indicating thereby the presence of a substantial number of free amino and carboxyl groups. Concentrated hydrochloric acid hydrolysis of polyvinylsuccinimide gave a dark-brown solid which had a total nitrogen content by the Kjeldahl method of 16.95 per cent, and an amino nitrogen content of 12.65 per cent by the Van Slyke method. The hydrolyzed product consisted, therefore, of approximately 75 per cent free amino groups and 25 per cent of incompletely hydrolyzed imide groups. The hydrolysis of polyvinylsuccinimide with ethanolamine gave a hydrolytic product having but 40 per cent of the nitrogen in the form of primary amine groups.

We have found, however, that substantially pure polyvinylamine salts and N-acyl derivatives thereof can be prepared from polyvinyl cyclic imides containing from 5 to 6 atoms in the ring and having the general formula:

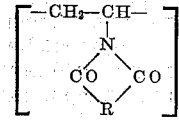

wherein R represents a divalent organic radical, for example, ethylene group, 1,2-propylene group, 1,2-phenylene group or said groups substituted in the free positions by one or more alkyl, alkoxy, phenyl, carbethoxy, or halogen groups, by first reacting the polyvinyl cyclic imide with hydrazine hydrate to form a substituted cyclic hydrazide of a phthalic acid, and then treating this compound with an acid, for example, hydrochloric, hydrobromic, glacial acetic, alpha-chloropropionic or bromobenzoic acid, to obtain corresponding salts of polyvinylamine admixed with a phthalyl hydrazide, from which mixture we have been able to isolate practically pure polyvinylamine salts, that is, a polyvinylamine salt wherein at least 90 per cent by weight of the total nitrogen present is in the form of amino nitrogen and the remainder of the nitrogen in the form of incompletely hydrolyzed imide groups. The free base, polyvinylamine, can be freed from our new salts by generally similar procedures to those employed for obtaining organic amines from their salt compounds, but preferably under conditions free from carbon dioxide contamination.

We have found further that the salts of polyvinylamine can also be prepared from the polyvinyl cyclic imides defined above by following a modified procedure, wherein a polyvinyl acylamide is first prepared as the intermediate, and then hydrolyzed to a salt of polyvinylamine. This particular method of our invention can be performed by the steps of treating the isolated and dried reaction product of a polyvinyl cyclic imide and hydrazine hydrate with an acylating agent, isolating the polyvinyl acylamide so obtained, and hydrolyzing the amide to a salt of polyvinylamine.

The polyvinyl cyclic amides employed as the starting material of our invention can be prepared by pyrolysis of the N-(beta-acyloxyethyl) derivatives of cyclic imides containing 5 to 6 atoms in the ring and having the general formula:

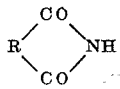

wherein R represents a divalent organic radical, for example, ethylene group, 1,2-propylene group, 1,2-phenylene group or one of said groups substituted in the free positions by one or more radicals, for example, halogen, alkyl, alkoxy, phenyl, carbethoxy, and polymerizing the N-vinyl cyclic imide obtained. There can be prepared by this method, for example, polyvinylphthalimide from N-(beta-acetoxyethyl) phthalimide, polyvinylsuccinimide from N-(beta-acetoxyethyl) succinimide, polyvinyl glutarimide from N-(beta-acetoxyethyl) glutarimide.

Our new salts of polyvinylamine are excellent dispersing agents, as well as intermediates for the preparation of polyvinylamine and other polyvinylamine derivatives. The polyvinyl acylamides of our invention can be employed as intermediates, and as material for film base and synthetic fibers.

It is, accordingly, an object of our invention to provide salts of polyvinylamine. A further object is to provide N-acyl derivatives of polyvinylamine. Another object is to provide a process for preparing salts of polyvinylamine and N-acyl derivatives of polyvinylamine. Other objects of our invention will become apparent hereinafter.

The following examples will serve to illustrate our new compounds and the manner of obtaining the same.

*Example I.—Preparation of polyvinyl phthalimide*

444 grams of N-vinyl phthalimide, obtained by pyrolysis of N-(beta-acetoxyethyl) phthalimide, were refluxed for a period of 48 hours in 2200 cc. of a solution consisting of 85 per cent ethylene chloride and 15 per cent methanol and containing 2.25 grams of benzoyl peroxide. The clear, viscous dope obtained was precipitated into ethanol, the polyvinylphthalimide being obtained in the form of a white, brittle, fibrous precipitate. The yield was 400 grams.

*Example II.—Polyvinylamine hydrochloride*

100 grams of polyvinylphthalimide prepared as in Example I were ground to 20 mesh, mixed with 150 cc. of 85 per cent hydrazine hydrate and refluxed for one hour. A crystalline material separated out of solution on cooling. Without separating the crystals, water was added and the mixture heated until solution was complete. The solution was then cooled and precipitated into ethanol, yielding a white polymeric material which was filtered out and dried at 110° C. The yield of this product was 47 grams. The product was then mixed with an excess of concentrated hydrochloric acid, the mixture refluxed for two hours and filtered. The residue on the filter, containing both the polyvinylamine hydrochloride and phthalhydrazide, was mixed with water, stirred and centrifuged to remove the insoluble phthalhydrazide. The aqueous filtrate from the centrifuging operation was filtered and precipitated in ethanol to give a white polymer, which was purified by repeated extractions with methanol. The yield of dried product was 18 grams. Analysis for total nitrogen by the Dumas method showed 17.09 per cent by weight nitrogen compared with theoretical of 17.6 per cent by weight nitrogen calculated for polyvinylamine hydrochloride, $(C_2H_5N \cdot HCl)_n$. The total chlorine content was found to be 41.53 per cent by weight compared with theoretical of 44.6 per cent by weight calculated for polyvinylamine hydrochloride. To determine the proportion of nitrogen present as amino nitrogen, the chlorine content found was converted to equivalent nitrogen on the basis that each mole of amino group had combined with one mole of hydrogen chloride. This gave a figure of 16.38 per cent by weight of nitrogen present as amino nitrogen, indicating thereby that the product obtained had approximately 95.8 per cent of the nitrogen present in the form of free amino groups and 4.2 per cent present in the form of incompletely hydrolyzed imide group. The analytical findings indicated, therefore, that the product was substantially pure polyvinylamine hydrochloride. In place of hydrochloric acid, there can be substituted in the above example, glacial acetic acid or alpha-chloropropionic acid to obtain polyvinylamine acetate or polyvinyl-alpha-chloropropionate.

*Example III.—Polyvinyl acetamide*

100 grams of polyvinylphthalimide were refluxed in 150 cc. of 85 per cent hydrazine hydrate. The imide dissolved completely and then a mass of crystalline material separated out of solution. Water was added and heat applied until solution was again complete. A white, fibrous material was obtained by precipitating the solution in ethanol. The material was leached in fresh ethanol, and dried at 60° C. The yield was 69 grams. This intermediate addition polymer of indeterminate structure was ground to 40 mesh, added to 180 cc. of acetic anhydride and refluxed for 45 minutes. On cooling, a crystalline material began to separate out of the clear solution. The mixture was poured into an excess of acetone, whereby the crystalline material dissolved and a white resin was precipitated. Analysis of the resin gave by weight 15.62 per cent nitrogen, 8.12 per cent hydrogen, and 55.10 per cent carbon compared to theoretical of 16.5 per cent nitrogen, 8.24 per cent hydrogen and 56.5 per cent carbon calculated as polyvinyl acetamide, $(C_4H_7NO)_n$.

In place of acetic anhydride in the above example, there can be substituted other acyl anhydrides, for example, propionic, butyric, phenoxyacetic and benzoic anhydrides to give corresponding acyl amides of polyvinylamine. Similarly, there can be substituted for polyvinylphthalimide in the above example, other polyvinyl cyclic imides, such as polyvinylsuccinimide, polyvinyl glutarimide, and their simpler substitution products.

*Example IV.—Polyvinylamine hydrochloride from polyvinyl acetamide*

6 grams of polyvinyl acetamide were refluxed with 100 cc. of 6 normal hydrochloric acid for 3 hours. Upon cooling, a resin precipitated to the bottom of the flask. This resin was separated and dissolved in water and reprecipitated in ethanol to give a brittle, fibrous, straw colored material which was leached with fresh ethanol, redissolved in water, filtered and finally precipitated in acetone. This product was identified as polyvinylamine hydrochloride.

Example V.—Polyvinyl benzamide 20 grams of polyvinylamine hydrobromide were dissolved in 250 cc. of water. To this solution, there was added 13 grams of sodium hydroxide dissolved in 100 cc. of water. The resulting solution was stirred while 25 grams of benzoyl chloride were slowly added. A white granular resin separated out of solution. The reaction mixture was stirred for a total of 3 hours. The precipitate was separated from the solution, washed well with water and dried. It was then dissolved in methanol and precipitated in water. After thorough drying at 60° C., the dry resin was leached in dry acetone. A sample dried at 70° C. in vacuum contained 9.41 per cent by weight of nitrogen by the Dumas method compared with the theoretical calculated value of 9.52 per cent for polyvinylbenzamide, $(C_9H_9NO)_n$. The polyvinylbenzamide was soluble in methanol, ethanol, acetone-water mixture or dioxane-water mixture, and insoluble in dry acetone, dry dioxane or water.

Example VI.—Polyvinylamine hydrobromide

A. 45 grams of polyvinylphthalimide were added to a mixture of 100 cc. of water and 100 cc. of 85 per cent hydrazine hydrate, the reaction mixture refluxed for 18 hours and subjected to steam distillation, until a total of about 4 liters of distillate had been collected. The solution remaining in the reaction vessel was cooled, whereupon a resinous mass settled out of solution. The supernatant liquid was decanted, the resin dissolved in warm water, and then precipitated in 48 per cent hydrobromic acid. The solid obtained was separated and dispersed by stirring in water. The polyvinylamine hydrobromide and hydrazine hydrobromide dissolved leaving phthalhydrazide as an insoluble material, which was separated by centrifuging and filtering. The filtrate from this operation was then concentrated to a suitable viscosity, filtered and precipitated in methanol, the insoluble polyvinylamine hydrobromide being precipitated, separated, extracted with methanol and dried. Analysis gave 61.33 per cent by weight of bromine and 10.73 per cent by weight of nitrogen compared with the theoretically calculated values for polyvinylamine hydrobromide $(C_2H_6NBr)_n$ of 64.5 per cent bromine and 11.28 per cent nitrogen. Assuming that each bromine atom was combined with one free amino group, by calculation, the amount of bromine was equivalent to 10.74 per cent nitrogen. In other words, all the nitrogen in the compound was present as amino nitrogen, and the product was substantially pure polyvinylamine hydrobromide.

B. 40 grams of polyvinylphthalimide were refluxed with a mixture of 80 cc. of 85 per cent hydrazine hydrate and 80 cc. of distilled water. The resulting solution was concentrated under reduced pressure on a steam bath. After a portion of the solvent had been removed, a mass of crystalline hydrazine hydrate salt of phthalhydrazide, $C_8H_6N_2O_2 \cdot (NH_2)_2$, separated out of solution. The reaction mixture was cooled and methanol added. The resin at this stage was substantially polyvinylamine soluble in methanol, whereas the hydrazine salt of phthalhydrazide was insoluble in methanol. After filtering off the latter, the filtrate was vacuum distilled to remove the methanol, and the residue poured in to a solution of 30 grams of barium hydroxide, $Ba(OH)_2 \cdot 8H_2O$, dissolved in warm water. Barium phthalhydrazide crystallized out of solution immediately. It was removed by filtration, the filtrate cooled, and more of the barium phthalhydrazide then filtered out. Carbon dioxide was passed into the filtrate to remove excess barium salt as insoluble barium carbonate. The precipitate of barium salt was filtered out, the filtrate concentrated under vacuum, and the additional barium carbonate which separated was filtered off. It was found that a polyvinylamine salt of carbonic acid had been formed which was stable in boiling water. The filtrate containing the dispersion or dope of this carbonic acid salt of polyvinylamine was poured into concentrated hydrobromic acid. The precipitate of polyvinylamine hydrobromide was filtered out, washed well with fresh methanol, leached with additional methanol and dried at 70° C. Analysis gave 61.12 per cent by weight of bromine and 11.42 per cent by weight of nitrogen. This calculates to 93.8 per cent of the nitrogen present in the form of amino nitrogen.

Since both hydrazine hydrobromide and hydrazine hydrochloride are sufficiently soluble in methanol, ethanol or acetone, and the salts of polyvinyl are insoluble, these solvents can be used interchangeably in the precipitation, extraction and leaching steps of our process for the preparation of the salts of polyvinylamine.

Example VII.—Polyvinylamine hydrobromide from polyvinylacetamide 20 grams of polyvinyl acetamide were refluxed with concentrated hydrobromic acid. The polyvinyl acetamide dissolved, and then polyvinylamine hydrobromide settled out of solution. After cooling, the supernatant liquid was decanted, the resinous mass remaining then dissolved in water, the solution filtered and precipitated in methanol. The precipitate of polyvinylhydrobromide obtained was extracted with fresh methanol and dried. Analysis gave 11.42 per cent by weight of nitrogen and 57.10 per cent by weight of bromine.

Example VIII.—Polyvinylamine alpha-chloropropionate 40 grams of polyvinylphthalimide were refluxed for one hour in a mixture of 80 cc. of 85 per cent hydrazine hydrate and 80 cc. of distilled water. The resulting solution was concentrated under reduced pressure on a steam bath. After a portion of the solvent had been removed, a mass of crystalline hydrazine hydrate salt of phthalhydrazide separated out of solution. The reaction mixture was cooled and methanol added. The resin at this stage was substantially polyvinylamine soluble in methanol, whereas the hydrazine salt of phthalhydrazide was insoluble in methanol. After filtering off the latter compound, the filtrate was vacuum distilled to remove the methanol, and the residue poured into a solution of 30 grams of barium hydroxide, dissolved in warm water. Barium phthalhydrazide crystallized out of solution immediately. It was removed by filtration, the filtrate cooled, and more of the barium phthalhydrazide then filtered off. Carbon dioxide was passed into the filtrate to remove excess barium as the insoluble carbonate salt. The precipitate of barium carbonate was filtered off, the filtrate concentrated under vacuum, and the additional barium carbonate which separated was filtered off. The resulting dispersion or dope containing the carbonic acid salt of polyvinylamine was precipitated in methanol, and resin obtained, leached and dried. The dried resin was dissolved in an excess of alpha-chloropropionic acid. Carbon dioxide was evolved. The acid dope solution was precipitated in ethyl ether, the precipitate so obtained redissolved in methanol, reprecipitated in ethyl ether, and dried at 50° C. in vacuum. Analysis of the resinous product gave 22.24 per cent chlorine by weight compared to 23.43 per cent by weight chlorine calculated for polyvinylamine alpha-chloropropionate $(C_5H_{10}NO_2Cl)_n$.

The following table represents a compilation of results found by analysis of various samples of our new hydrochloride and hydrobromide salts of polyvinylamine prepared in the manner of our examples. This table further illustrates the degree of hydrolysis of the cyclic imide groups to amino groups obtained by the process of our invention. Column I represents the per cent by weight of chlorine or bromine found, column II the per cent by weight of nitrogen found, column III the percent by weight of nitrogen calculated from the chlorine or bromine values of column I and is representative of nitrogen present as amino nitrogen, and column IV represents the percentage of the total nitrogen found which is combined in the form of amino groups.

Table.—Analysis of polyvinylamine hydrochloride and hydrobromide

Calculated theoretical for $C_2H_6NCl$—$Cl=44.6\%$ by weight
$\phantom{Calculated theoretical for C_2H_6NCl—}N=17.6\%$ by weight
Calculated theoretical for $C_2H_6NBr$—$Br=64.4\%$ by weight
$\phantom{Calculated theoretical for C_2H_6NBr—}N=11.3\%$ by weight

| Found by Analysis | | Calculated | |
|---|---|---|---|
| Per Cent Halogen | Per Cent Nitrogen | Per Cent Nitrogen from Halogen Analysis | Per Cent of Total Nitrogen Combined as —$NH_2$ |
| 41.53 Cl | 17.09 | 16.38 | 95.8 |
| 40.80 Cl | 16.53 | 16.09 | 97.2 |
| 56.91 Br | 10.90 | 9.97 | 91.4 |
| 61.33 Br | 10.73 | 10.74 | 100.0 |
| 60.40 Br | 11.30 | 10.58 | 93.7 |
| 59.64 Br | 11.38 | 10.45 | 91.9 |
| 60.27 Br | 11.34 | 10.57 | 93.2 |
| 62.79 Br | 11.20 | 11.00 | 98.2 |
| 61.12 Br | 11.42 | 10.71 | 93.8 |

In the above table, the results found by analysis are generally lower than the calculated theoretical values. This can be explained partly by the fact that the salts of polyvinylamine are quite hygroscopic.

Our new salts of polyvinylamine and N-acyl derivatives can be used as intermediates for the preparation of substantially pure polyvinylamine. The latter compound is extremely valuable for the further preparation of various amino substituted derivatives. Polyvinylamine or copolymers of polyvinylamine are excellent dispersing agents for silver halides and may be used as protective colloids in photographic emulsions either alone or in conjunction with vehicles such as polyvinyl alcohol, cellulose ethers, well hydrolyzed cellulose esters, and similar kinds of materials.

What we claim is:

1. A process for preparing a salt of basic polyvinylamine in which at least 90% of the nitrogen atoms attached to carbon atoms in the polyvinyl chain are in the form of —$NH_2 \cdot HX$ groups, wherein X is an anion selected from the group consisting of a chloride ion, a bromide ion, an acetate ion, an alpha-chloropropionate ion and a bromobenzoate ion, comprising reacting a polyvinyl cyclic imide selected from the group consisting of polyvinylphthalimide, polyvinylsuccinimide and polyvinylglutarimide with hydrazine hydrate, treating the resinous product resulting therefrom with an acid selected from the group consisting of hydrochloric, hydrobromic, glacial acetic, alpha-chloropropionic and bromobenzoic acids, separating and dispersing the mixture of insoluble salts obtained thereby in water, separating the filtrate from the dispersion, and precipitating it in a water-miscible monohydroxy aliphatic alcohol, and separating the precipitate of the salt of the basic polyvinylamine which forms.

2. A process for preparing a salt of basic polyvinylamine in which at least 90% of the nitrogen atoms attached to carbon atoms in the polyvinyl chain are in the form of —$NH_2 \cdot HBr$ groups, comprising reacting polyvinylphthalimide with hydrazine hydrate, treating the resinous product resulting therefrom with hydrobromic acid, separating and dispersing the mixture of insoluble salts obtained thereby in water, separating the filtrate from the dispersion and precipitating it in a water-miscible, monohydroxy aliphatic alcohol, and separating the precipitate of polyvinylamine hydrobromide which forms.

3. A process for preparing a salt of basic polyvinylamine in which at least 90% of the nitrogen atoms attached to carbon atoms in the polyvinyl chain are in the form of —$NH_2 \cdot HBr$ groups, comprising reacting polyvinylphthalimide with hydrazine hydrate, treating the resinous product resulting therefrom with hydrobromic acid, separating and dispersing the mixture of insoluble salts obtained thereby in water, separating the filtrate from the dispersion and precipitating it in methanol, and separating the precipitate of polyvinylamine hydrobromide which forms.

4. A process for preparing a salt of basic polyvinylamine in which at least 90% of the nitrogen atoms attached to carbon atoms in the polyvinyl chain are in the form of —$NH_2 \cdot HCl$ group, comprising reacting polyvinylphthalimide with hydrazine hydrate, treating the resinous product resulting therefrom with hydrochloric acid, separating and dispersing the mixture of insoluble salts obtained thereby in water, separating the filtrate from the dispersion, and precipitating it in a water-miscible monohydroxy aliphatic alcohol, and separating the precipitate of polyvinylamine hydrochloride which forms.

5. A process for preparing a salt of basic polyvinylamine in which at least 90% of the nitrogen atoms attached to carbon atoms in the polyvinyl chain are in the form of —$NH_2 \cdot HCl$ groups, comprising reacting polyvinylphthalimide with hydrazine hydrate, treating the resinous product resulting therefrom with hydrochloric acid, separating and dispersing the mixture of insoluble salts obtained thereby in water, separating the filtrate from the dispersion, and precipitating it in methanol, and separating the precipitate of polyvinylamine hydrochloride which forms.

6. A process for preparing a salt of basic polyvinylamine in which at least 90% of the nitrogen atoms attached to carbon atoms in the polyvinyl chain are in the form of —$NH_2 \cdot HOCOCH_3$ groups, comprising reacting polyvinylphthalimide with hydrazine hydrate, treating the resinous product resulting therefrom with glacial acetic acid, separating and dispersing the mixture of insoluble salts obtained thereby in water, separating the filtrate from the dispersion and precipitating it in a water-miscible monohydroxy aliphatic alcohol, and separating the precipitate of polyvinylamine hydroacetate which forms.

7. A process for preparing a salt of basic polyvinylamine in which at least 90% of the nitrogen atoms attached to carbon atoms in the polyvinyl chain are in the form of —NH₂·HOCOCH₃ groups, comprising reacting polyvinylphthalimide with hydrazine hydrate, treating the resinous product resulting therefrom with glacial acetic acid, separating and dispersing the mixture of insoluble salts obtained thereby in water, separating the filtrate from the dispersion and precipitating it in methanol, and separating the precipitate of polyvinylamine hydroacetate which forms.

DELBERT D. REYNOLDS.
WILLIAM O. KENYON.

REFERENCES CITED

The following references are of record in the file of this patent:

UNITED STATES PATENTS

| Number | Name | Date |
|---|---|---|
| 2,231,905 | Hanford et al. | Feb. 18, 1941 |

OTHER REFERENCES

Jones et al.: Journal of Organic Chemistry, November 1944, pages 500–512.